United States Patent [19]

Williamson

[11] Patent Number: 4,649,705
[45] Date of Patent: Mar. 17, 1987

[54] COMPOSITE HYDRAULIC SYSTEM
[75] Inventor: William A. Williamson, Niles, Mich.
[73] Assignee: Clark Equipment Company, South Bend, Ind.
[21] Appl. No.: 733,833
[22] Filed: May 14, 1985
[51] Int. Cl.[4] ............................................. F16D 31/02
[52] U.S. Cl. ...................................... 60/420; 60/447; 60/452; 60/484
[58] Field of Search ................. 60/420, 424, 426, 445, 60/447, 448, 449, 452, 484, 486

[56] References Cited

U.S. PATENT DOCUMENTS

| | | | |
|---|---|---|---|
| 2,353,388 | 7/1944 | Cannon | 100/46 |
| 2,353,389 | 7/1944 | Cannon | 100/46 |
| 3,355,994 | 12/1967 | Malott | 60/422 |
| 3,535,877 | 10/1970 | Becker et al. | 60/421 |
| 4,476,679 | 10/1984 | Sato | 60/484 X |
| 4,545,201 | 10/1985 | Backe et al. | 60/426 X |

Primary Examiner—Stephen F. Husar
Attorney, Agent, or Firm—Kenneth C. Witt; John C. Wiessler

[57] ABSTRACT

A composite hydraulic system for a work vehicle which has two separate hydraulic circuits. Included in the composite system are three pumps, two of which supply the two circuits on the vehicle. A third pump transfers hydraulic fluid between the two hydraulic circuits. An engine operates all three pumps simultaneously and means are provided whereby the third pump under certain conditions operates as a motor to provide regeneration.

17 Claims, 7 Drawing Figures

COMPOSITE HYDRAULIC SYSTEM

BACKGROUND OF THE INVENTION

1. Field of the Invention

This invention relates to a composite hydraulic system for providing two separate functions on a work vehicle such as causing steering of an articulated loader vehicle and operating the implements of the same articulated loader vehicle.

2. Description of the Prior Art

U.S. Pat. No. 2,353,388 Cannon and 2,353,389 Cannon disclose hydraulic systems which operate on a similar principle to the present invention. That is, they are three-pump systems in which two pumps respectively provide the principal supply to separate hydraulic circuits while the third pump is a variable displacement pump connected between the two circuits to provide transfer of hydraulic fluid in either direction at variable volume depending on external conditions. In these two patents all three pumps are driven by individual electric motors, and since they are always transferring fluid from low pressure to high pressure they are incapable of regeneration. However, in the present invention the three pumps are driven by the same engine thereby providing for regeneration.

U.S. Pat. No. 3,355,994 Malott is directed to solving the same problem solved by the present invention, namely, to improve the performance and efficiency of the steering and implement hydraulic circuits on a work vehicle. Malott uses a three-pump system with all three pumps driven by the same engine, however, all three pumps also operate from the same reservoir. In other words, the third pump is not a transfer or switch pump as in the present invention but instead supplies either or both of the two individual hydraulic circuits depending upon the condition of a flow dividing or demand valve. The condition of such valve in turn is dependent upon the flow in the steering system which is sensed by a variable orifice in the demand valve.

U.S. Pat. No. 3,535,877 Becker et al teaches the addition of an unloader valve to the hydraulic system of the Malott patent. The unloader valve diverts to the reservoir either the output of the third pump or the implement output of the demand valve when implement pressure exceeds a predetermined value, and delivers the output to the implement circuit when that pressure reduces to a predetermined lower value.

SUMMARY OF THE INVENTION

This invention is a composite hydraulic system for a work vehicle which has two hydraulic circuits. A first pump supplies one of the hydraulic circuits primarily, and a second pump supplies the other hydraulic circuit primarily. A third pump transfers hydraulic fluid between the two hydraulic circuits. An engine operates the three pumps simultaneously. Means are provided whereby the third pump under at least one condition of operation operates as a motor to return energy to the engine.

DETAILED DESCRIPTION OF THE PREFERRED EMBODIMENT

The embodiment of the invention which is described and illustrated herein is for an articulated end loader. Such a work vehicle is steered by pivoting the front portion of the frame and the rear portion of the frame relative to each other, the two portions of the frame being connected by a hinge pin between them. The two portions of the frame are pivoted relative to each other by means of a pair of hydraulic cylinders which operate in push-pull relation to steer the vehicle. Such cylinders are part of the frame structure of the vehicle and require large amounts of pressurized hydraulic fluid. Such a work vehicle in a tyPical case has a pivoted boom arm which is raised and lowered relative to the frame by a third hydraulic cylinder and has a bucket pivotally mounted at the end of the boom arm which is operated by a fourth hydraulic cylinder.

Figure 2:
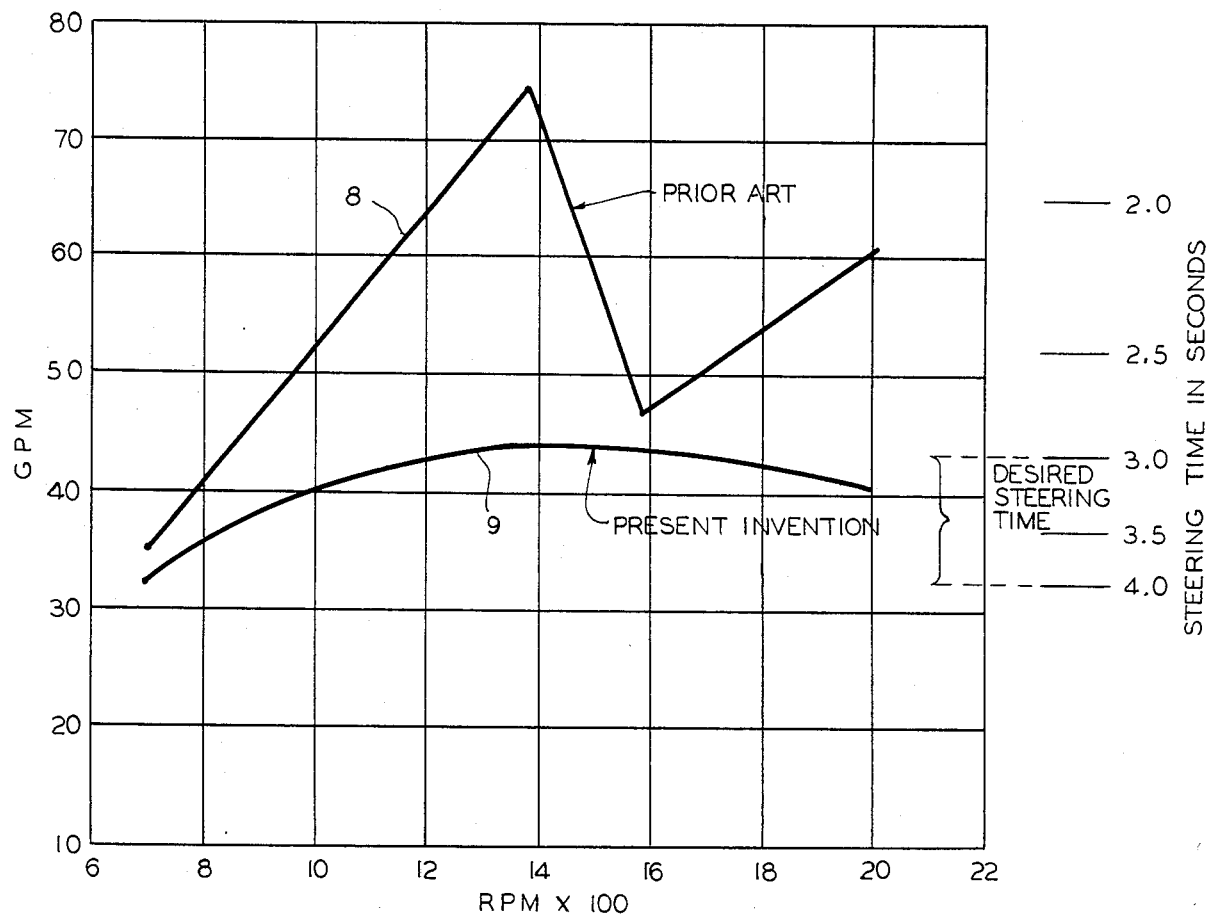

In a typical prior art articulated loader four pumps are required to accomplish the functions of steering the vehicle and operating the boom arm and bucket. There are two steering pumps and two implement pumps, implement pumps as used herein meaning the pumps which supply hydraulic circuits on the vehicle other than those used for the steering function. The critical time for such a steering hydraulic system is when the engine is idling. There must be enough oil delivered to satisfy steering requirements at idling speed; however, if a single pump were used for this purpose, when the vehicle operated at high engine speed because of the added hydraulic flow the steering would be too sensitive and the machine difficult to control. Therefore, two smaller pumps are utilized. When the engine is idling the two pumps jointly supply the steering hydraulic circuit. At about mid-speed range of the engine one of the steering pumps is cut out of the circuit thereby reducing the flow of hydraulic fluid to the steering circuit. When the engine is at a higher or operating speed, the flow from the remaining pump is adequate to provide satisfactory steering. Referring to FIG. 2 of the drawing there is shown by the upper line 8 of the graph the characteristics of such a prior art two-pump hydraulic steering system for an articulated loader vehicle of approximately three cubic yards bucket capacity. Along the ordinate of the graph is plotted hydraulic flow in GPM (gallons per minute). Along the abscissa is plotted engine speed in RPM (revolutions per minute) times 100. The curved line 9 below line 8 illustrates the characteristics of hydraulic flow plotted against engine speed for an articulated vehicle of about the same bucket capacity which embodies the present invention There is also indicated in FIG. 2 the approximate steering time, from one extreme position of the steering mechanism to the other; the time is shown in seconds along the right side of the FIG. 2.

In a typical prior art vehicle two other pumps are used to supply the implement hydraulic circuits, the two pumps being used as an energy conservation arrangement. They are arranged so that one pump cuts out under intermediate pressure somewhat below maximum system pressure. Maximum pressure may be required when breaking a load loose in a digging operation. At this time little hydraulic flow is required; therefore, one of the pumps is cut out of the circuit and in the event the system reaches maximum pressure which causes a relief valve to operate, less energy is lost.

Figure 3:
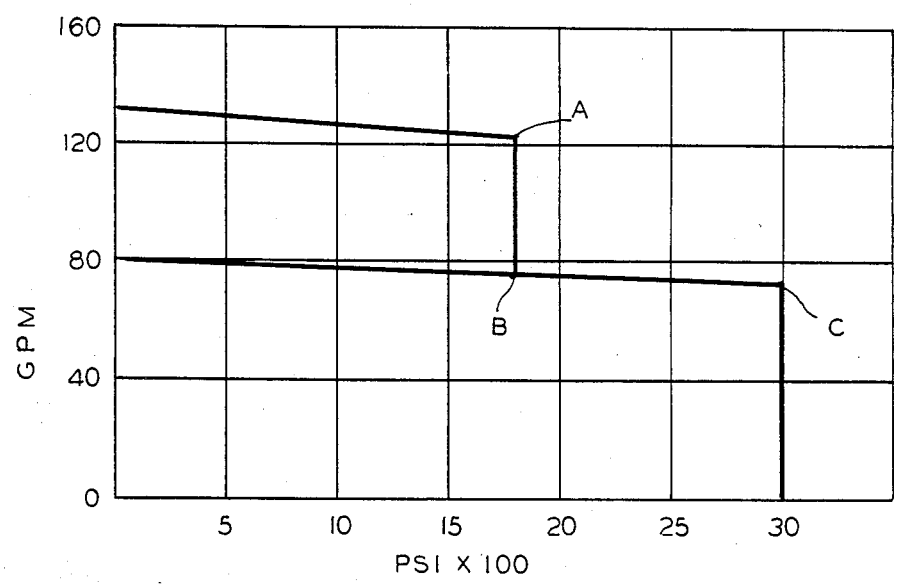
FIG. 3 is a graph illustrating the performance of a prior art hydraulic circuit.

FIG. 3 of the drawing shows a graph of the implement fluid flow vs. the hydraulic pressure of the same typical prior art loader as FIG. 2, the pressure being plotted in PSI (pounds per square inch) times 100. FIG. 3 shows that starting with zero pressure and up to about 1800 PSI, as indicated by point A, two pumps jointly supply the implement hydraulic circuits. When one pump is cut out of the system the flow of hydraulic fluid to the steering circuit drops immediately to about 76 gallons per minute as indicated by point B. As the speed of the engine and consequently the pressure increase the flow from the single pump supplying the main hydraulic system continues up to the maximum, as shown at point C, at which point a relief valve operates to maintain the pressure at about 3000 PSI.

In the present invention the number of pumps is reduced from four to three and the total system displacement is reduced by approximately 35%. In addition, this composite system under certain circumstances is regenerative, thereby reducing energy losses.

Figure 4:
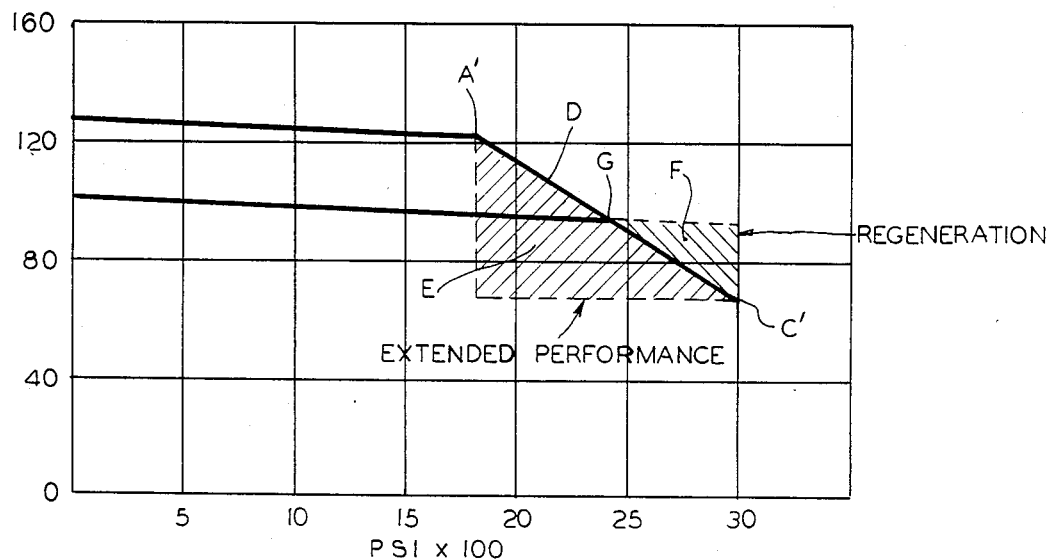
FIG. 4 illustrates the performance of the present invention.

FIG. 4 of the drawing illustrates the characteristics of a loader of the same size as for FIG. 3 but which embodies the present invention. As in FIG. 3 fluid flow is plotted against pressure. In FIG. 4 when the hydraulic pressure reaches approximately 1800 PSI at A' the third or intermediate transfer pump begins to divert hydraulic fluid from one hydraulic circuit to the other, and as the pressure increases there is a gradual smooth transfer of hydraulic fluid from the implement circuit to the steering circuit; this is illustrated by the line D of FIG. 4. As illustrated by the crosshatched portion E beneath line D there is extended performance because there is more fluid flow produced per unit of increased pressure (line D) than in FIG. 3. Unlike the abrupt change in flow in FIG. 3 the reduction of flow in FIG. 4 is gradual making the change less noticeable to the vehicle operator.

Referring to FIG. 4 when the implement circuit pressure reaches point G on line D the transfer pump 16 is at zero displacement and no fluid power is transferred in either direction. Up to this point some of the fluid from the steering circuit had been added to the implement circuit. A further increase in implement pressure causes the transfer pump to remove fluid from the implement circuit and add it to the steering circuit. Under this condition the transfer pump acts as a hydraulic motor, i.e., fluid enters the "motor" under high pressure and leaves under low pressure. Inside the "motor" the pressure is converted to torque which is put back into the engine. This reduces the displacement of the variable displacement pump and regenerates power.

Figure 1:
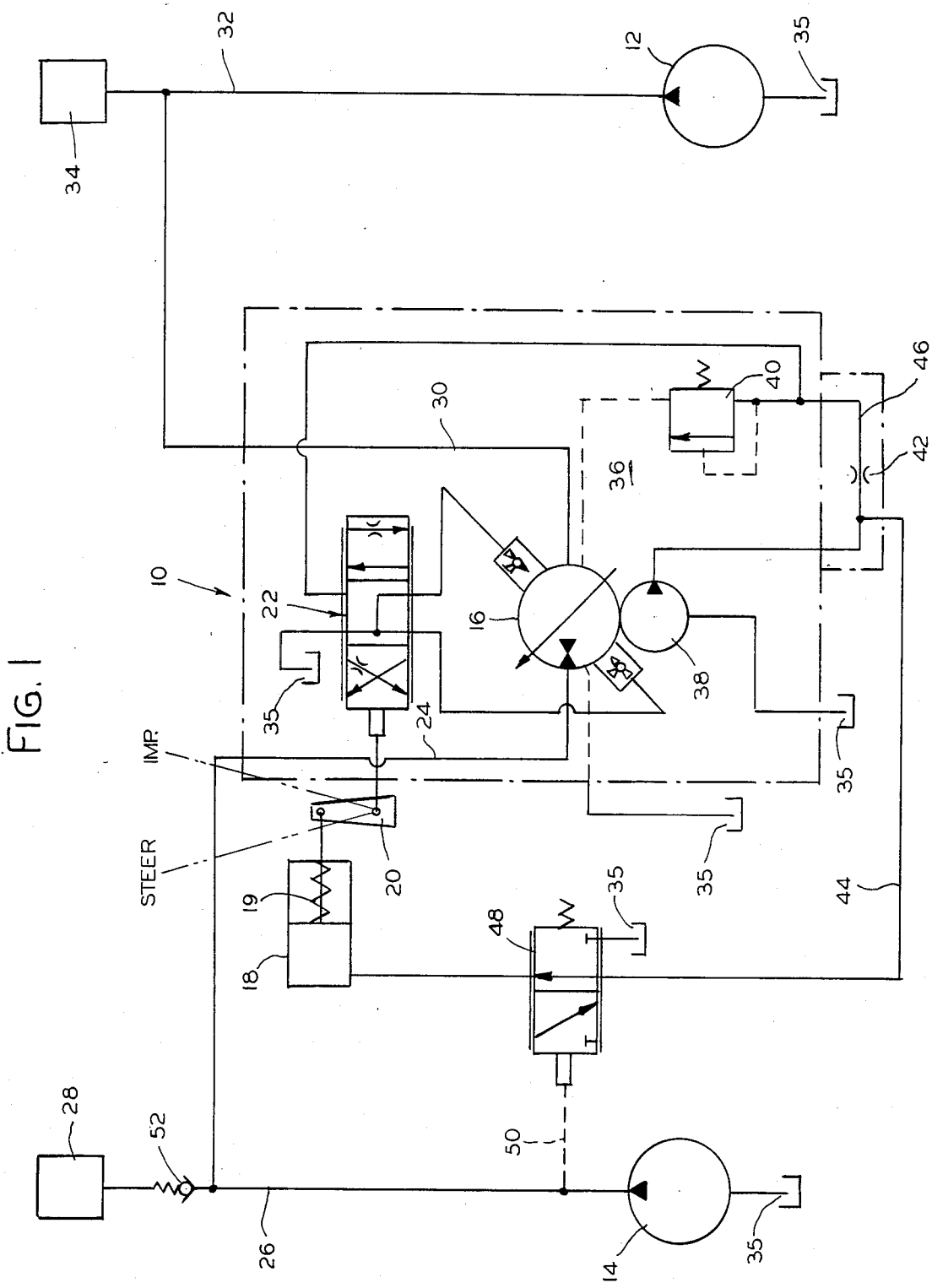
FIG. 1 of the drawing shows the composite system of this invention which embodies two hydraulic circuits, FIG. 2 has graphs illustrating the prior art and the present system.

Referring to FIG. 1, the composite hydraulic system 10 of this invention includes a steering pump 12, an implement pump 14 and a transfer pump 16. The steering and implement pumps are shown as fixed displacement pumps but could be variable displacement pumps with suitable controls. The transfer pump 16 is an over center servo controlled variable displacement pump. The displacement of pump 16 is controlled by spring loaded cylinder 18 connected to the pump servo mechanism. The position of cylinder 18 in turn is controlled by a differential pressure which is responsive to engine speed; this is explained later. The cylinder 18 through a lever 20 and a servo valve 22 controls pump 16. Conduit 24 connects pump 16 with discharge conduit 26 which conducts pressurized hydraulic fluid from pump 14 to implement valve 28. Valve 28 in a typical case supplies the hydraulic cylinders which operate the boom arm and the loader bucket on a loader vehicle. Conduit 30 connects pump 16 with conduit 32 from pump 12 to steering valve 34. Steering valve 34 in turn furnishes the pressurized hydraulic fluid for operating the hydraulic steering system of the vehicle. Pumps 12 and 14 of the composite hydraulic system withdraw hydraulic fluid from and return it to a common reservoir 35.

The pump 16 includes a supercharging circuit indicated generally by the numeral 36. The supercharging circuit comprises a small fixed displacement engine driven charging pump 38, a low pressure relief valve 40 which may in a typical case be set at approximately 200 PSI, and servo valve 22. This circuit permits uniform stroking force on the pump displacement control arm 20 and negates the swash plate centering moment which is a function of system pressure within pump 16.

Orifice 42 is located in the supercharge circuit 36 and produces a differential pressure in conduit 44 across orifice 42 which is proportional to engine speed. Such speed could be sensed also by using an orifice in conduit 26. However, the orifice 42 in conduit 46 between charge pump 38 and relief valve 40 produces a pilot signal which is responsive to engine speed and also permits the use of a much smaller orifice and fluid flow and consequently less loss of energy in the form of heat. Pumps 12, 14 and 38 are all fixed displacement pumps, and since they are all driven by the same engine their pressure outputs are proportional.

The valve 48 of FIG. 1 is a hydraulically actuated unloading valve that directs the flow of hydraulic fluid to and from the cylinder 18. The valve 48 is hydraulically connected to the implement circuit conduit 26 by pilot line 50. Up to a certain system pressure in the implement system, which may be approximately 2000 PSI in the typical case being described, valve 48 is inoperative. The valve 48 begins to actuate at 2000 PSI and is completely actuated at some higher pressure, usually the maximum pressure which is determined by the setting of the relief valve for the system which may be 3000 PSI. As the valve 48 progressively actuates, the hydraulic pressure in cylinder 18 is progressively lowered, causing the spring 19 acting through lever 20 and valve 22 to change the stroke on pump 16, thereby changing the flow rate and/or the direction of the hydraulic flow through pump 16. When the cylinder 18 is fully destroked, all of the flow in pump 16 is directed from the implement circuit to the steering circuit. At this time, pump 16 is operating as a hydraulic motor with high pressure on the implement valve side of the composite system and lower pressure on the steering valve side of the composite system. As a motor, the energy that this pump receives is put back into the mechanical drive system, that is the engine, in a regenerative manner. This means that at high pressure, the implement circuit has a reduction in hydraulic flow and a corresponding reduction in net energy utilized. Valves 48 and 22 are preferably of the feathering type and this is indicated by the horizontal lines immediately above and below the respective symbols for both valves.

An overcenter pump like pump 16 needs a small amount of pressure (usually under 50 PSI) directed to its suction side, no matter what the direction of hydraulic flow is, to hold the pistons against the swash plate and provide lubrication. In a preferred form of the present composite system, the steering valve 34 is a pressure compensated type valve and automatically supplies a 75 PSI back pressure to pump 16 under all conditions of engine speed. The implement valve 28 may not supply an adequate amount of back pressure to the other side of the pump 16 under engine idle conditions. For this situation, back pressure valve 52 is included in conduit 26 to supply the necessary back pressure, that is, it is designed to have an opening pressure sufficient to supply the necessary back pressure to pump 16.

Figure 5:
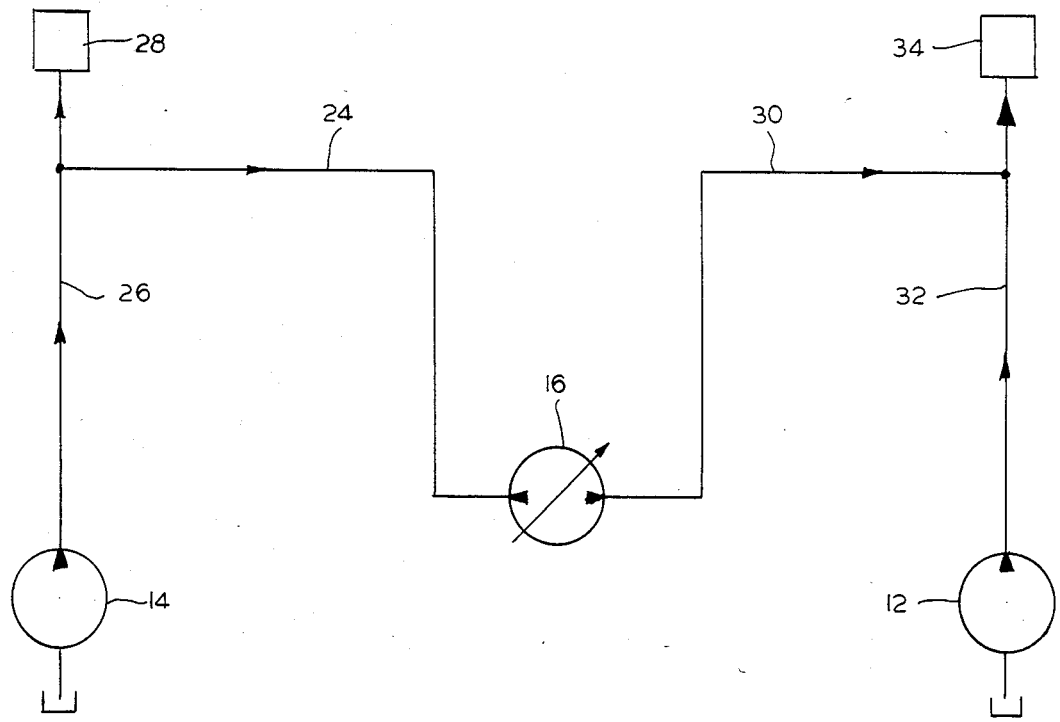
FIG. 5 is a diagram illustrating one condition of the present system.
Figure 6:
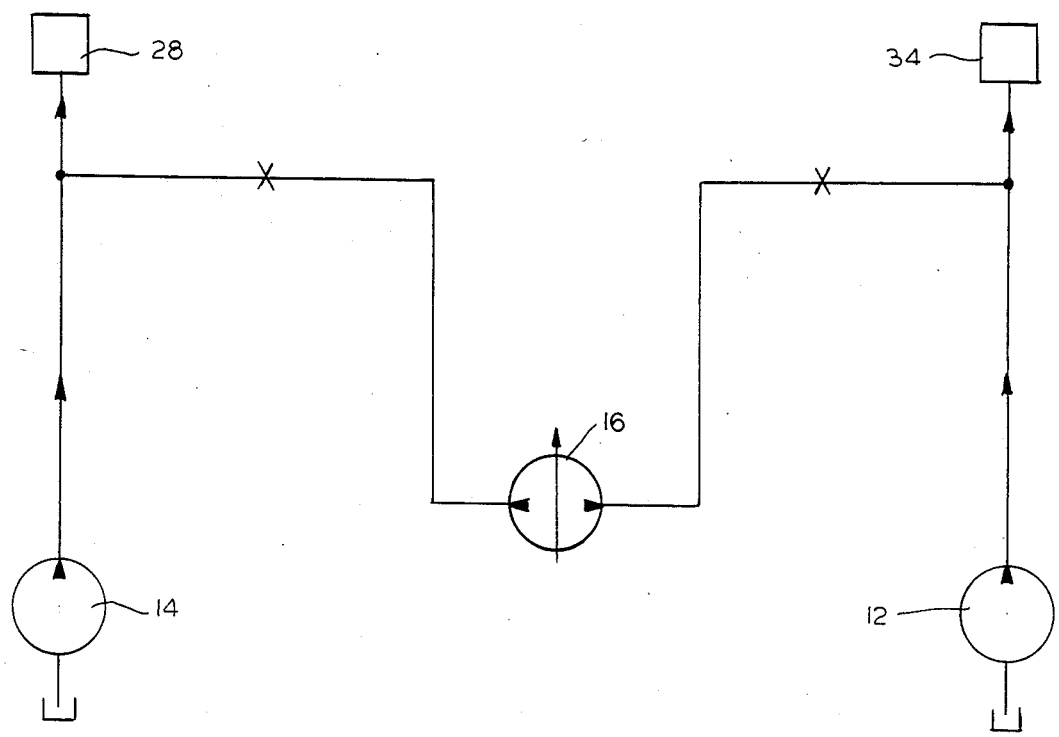
FIG. 6 illustrates another condition of the present system.
Figure 7:
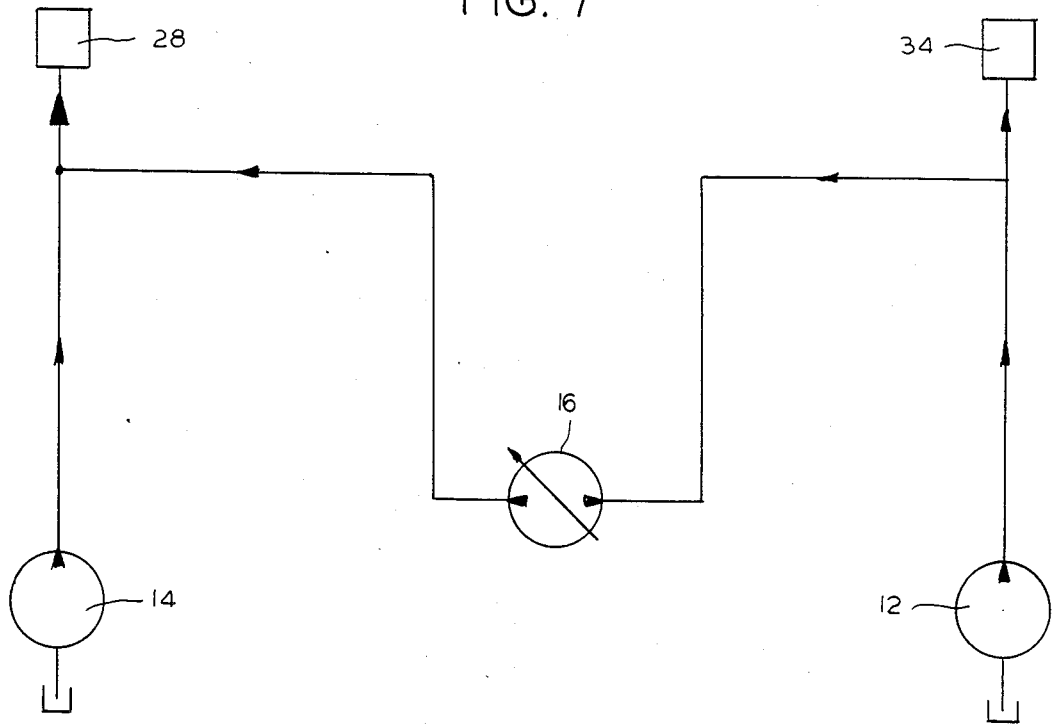
FIG. 7 illustrates still another condition of the present system.

The operation of the composite system is illustrated by the flow diagrams of FIGS. 5-7 inclusive of the drawing. In FIG. 5 the pump 16 is at maximum displacement toward the steering circuit and the engine is at idle speed. Some flow from the implement pump 14 is taken through conduits 26,24 into pump 16 and ultimately flows through conduits 30,32 to increase the total flow in the hydraulic steering system. It is added to the flow from pump 12, therefore the steering requirements are met by both the implement pump and steering pump.

As the engine speed is increased the pressure drop across orifice 42 (see FIG. 1) increases due to the increased flow from pump 38. This causes increased pressure upstream of the orifice which increased pressure is reflected through conduit 44, causing cylinder 18 to begin to destroke pump 16. This causes the implement pump 14 to contribute less to the total steering hydraulic flow and the steering pump 12 contributes more due to the increasing speed.

When the engine is at about half speed the pump 16 is at zero stroke and all the steering requirements are satisfied by pump 12 alone; this condition is illustrated by the diagram of FIG. 6.

As the engine speed increases further, the transfer pump 16 is stroked toward the implement system. At this time the pump 16 is transferring fluid from the steering circuit to the implement circuit. When the engine is near top speed, pump 16 is fully stroked and the excess fluid from the steering pump is added to the implement hydraulic circuit. This condition is illustrated in FIG. 7 of the drawing.

Another operating condition for this system is when the engine is running at high speed and both the steering pump and the implement pump are discharging a large flow since they are fixed displacement pumps. This is the condition under which this composite system provides for regeneration and returns energy to the engine. This condition looks the same diagrammatically as FIG. 5 but it is different in that the implement pump 14 is discharging a large flow, not a small flow. The maximum displacement of variable displacement pump 16 must be equal to or less than the displacement of either pump 12 or 14.

Reference herein to a hydraulic cylinder means a linear hydraulic motor comprising an outer barrel portion closed at one or both ends with a piston movable within the barrel to form a variable volume chamber on one or both sides of the piston, the piston being mounted on a rod which extends out one end of the barrel. Cylinder 18 is illustrative of a single acting cylinder having a single variable chamber subject to hydraulic pressure plus a spring against which such pressure acts to move the piston of the device.

While I have described and illustrated herein the best mode contemplated for carrying out my invention it will be appreciated that modifications may be made. Accordingly, it should be understood that I intend to cover by the appended claims all such modifications falling within the true spirit and scope of my invention.

I claim:

1. A composite hydraulic system for a work vehicle having an implement hydraulic circuit and a steering hydraulic circuit comprising
    a first pump which supplies said implement hydraulic circuit primarily,
    a second pump which supplies said steering hydraulic circuit primarily,
    a third pump which is operable also as a motor and which transfers hydraulic fluid between said implement and said steering hydraulic circuits,
    an engine which operates said three pumps simultaneously, and
    servo system means whereby said third pump under at least one condition of operation operates as a motor to provide regeneration.

2. A composite hydraulic system as in claim 1 wherein said third pump is of the variable displacement over center type.

3. A composite hydraulic system as in claim 1 where said first and second pumps are of the fixed displacement type.

4. A composite hydraulic system as in claim 1 which includes a steering valve.

5. A composite hydraulic system as in claim 4 wherein said steering valve is of the pressure compensated type.

6. A composite hydraulic system as in claim 1 wherein said means comprises a sensor which detects the speed of said engine.

7. A composite hydraulic system as in claim 1 wherein said means comprises a servo valve.

8. A composite hydraulic system as in claim 7 wherein said means comprises an operating cylinder for said servo valve.

9. A composite hydraulic system as in claim 7 wherein said means comprises a sensor which detects the speed of said engine and which operates said operating cylinder.

10. A composite hydraulic system as in claim 1 wherein said means comprises a supercharging circuit associated with said third pump.

11. A composite hydraulic system as in claim 10 wherein said supercharging circuit comprises a charging pump.

12. A composite hydraulic system as in claim 11 wherein said supercharging circuit comprises a relief valve.

13. A composite hydraulic system as in claim 11 wherein the discharge of said charging pump flows through an orifice and the differential pressure across said orifice is responsive to the speed of said engine.

14. A composite hydraulic system for a work vehicle having an implement hydraulic circuit and a steering hydraulic circuit, comprising
    a first pump which supplies said implement circuit primarily,
    a second pump which supplies said steering hydraulic circuit primarily, a third pump which transfers hydraulic fluid between said implement and said steering hydraulic circuits, an engine which operates said three pumps simultaneously, a reservoir for said three pumps, said third pump being supplied with hydraulic fluid indirectly through the other two pumps, said third pump being of the variable displacement over center type, a charging circuit for said third pump which includes a fixed displacement charging pump driven by said engine, an orifice in said charging circuit for producing a differential pressure between the output of said charging pump and the pressure in said reservoir which differential pressure is responsive to the speed of said engine, an unloader valve which is responsive to the output pressure of said first pump, a three position four way valve arranged to control the displacement of said third pump between neutral and variable displacement in either direction, a spring loaded hydraulic cylinder which operates said three position valve, and said hydraulic cylinder operated by hydraulic fluid flow from said charging pump through the said unloader valve.

15. A composite hydraulic system as in claim 14 wherein said first pump is of the fixed displacement type.

16. A composite hydraulic system as in claim 14 wherein said second pump is of the fixed displacement type.

17. A composite hydraulic system as in claim 14 wherein both said first and said second pumps are of the fixed displacement type.

* * * * *